United States Patent
Sato et al.

(10) Patent No.: US 7,268,812 B2
(45) Date of Patent: Sep. 11, 2007

(54) SOLID-STATE IMAGE PICKUP DEVICE AND PIXEL DEFECT TESTING METHOD THEREOF

(75) Inventors: Hiroki Sato, Kanagawa (JP); Nobuo Nakamura, Kanagawa (JP); Keiji Mabuchi, Kanagawa (JP); Takashi Abe, Kanagawa (JP); Tomoyuki Umeda, Kanagawa (JP); Hiroaki Fujita, Kanagawa (JP); Eiichi Funatsu, Tokyo (JP)

(73) Assignee: Sony Corporation (JP)

( * ) Notice: Subject to any disclaimer, the term of this patent is extended or adjusted under 35 U.S.C. 154(b) by 783 days.

(21) Appl. No.: 10/603,693

(22) Filed: Jun. 26, 2003

(65) Prior Publication Data

US 2004/0075759 A1    Apr. 22, 2004

(30) Foreign Application Priority Data

Jul. 5, 2002    (JP)    ............................ P2002-197512

(51) Int. Cl.
  *H04N 9/64*    (2006.01)
  *H04N 5/217*   (2006.01)

(52) U.S. Cl. .................. 348/246; 348/241; 348/187

(58) Field of Classification Search ................ 348/246, 348/241, 247, 187, 302; 250/559.45, 559.46; 324/765
See application file for complete search history.

(56) References Cited

U.S. PATENT DOCUMENTS 5,416,516 A * 5/1995 Kameyama et al. ........ 348/246
6,307,393 B1 * 10/2001 Shimura ...................... 324/765
6,340,989 B1 * 1/2002 Oda ............................ 348/246
6,683,643 B1 * 1/2004 Takayama et al. .......... 348/247
6,707,492 B1 * 3/2004 Itani .......................... 348/229.1
6,707,493 B1 * 3/2004 Lee et al. ................... 348/246
6,970,193 B1 * 11/2005 Kidono et al. .............. 348/245
7,106,371 B1 * 9/2006 Kubo et al. ................. 348/246
2002/0080253 A1 * 6/2002 Kim ........................... 348/246

FOREIGN PATENT DOCUMENTS

JP    06315112    8/1994

OTHER PUBLICATIONS

EPO Search Report Oct. 10, 2003.

* cited by examiner

*Primary Examiner*—Ngoc-Yen Vu
*Assistant Examiner*—Gregory V Madden
(74) *Attorney, Agent, or Firm*—Rader Fishman & Grauer PLLC; Ronald P. Kananen

(57) ABSTRACT

A solid-state image pickup device and a pixel defect testing method thereof are disclosed. A solid-state image pickup device including: a pixel unit having a plurality of unit pixels that perform photoelectric conversion; a driving circuit for driving the pixel unit to control output of a pixel output signal; an output signal processing circuit for subjecting the pixel output signal outputted from the pixel unit according to the driving of the driving circuit to predetermined signal processing, and outputting a resulting pixel output signal; a pixel defect determining circuit for capturing the pixel output signal outputted from the pixel unit according to the driving of the driving circuit, and determining a pixel defect by comparing the pixel output signal with a predetermined reference signal; and a timing generator for supplying a predetermined operating pulse to the driving circuit, the output signal processing circuit, and the pixel defect determining circuit.

12 Claims, 11 Drawing Sheets

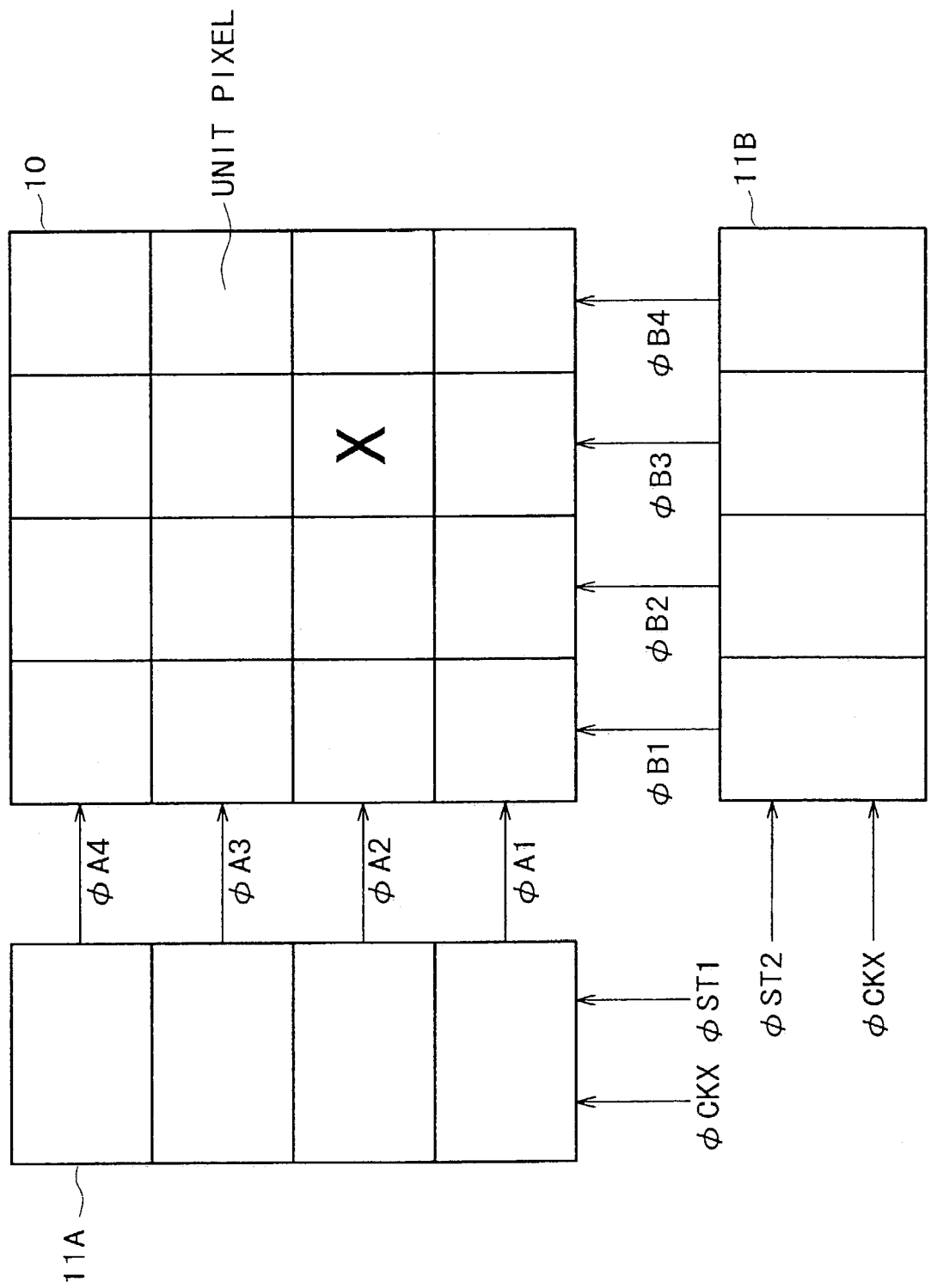

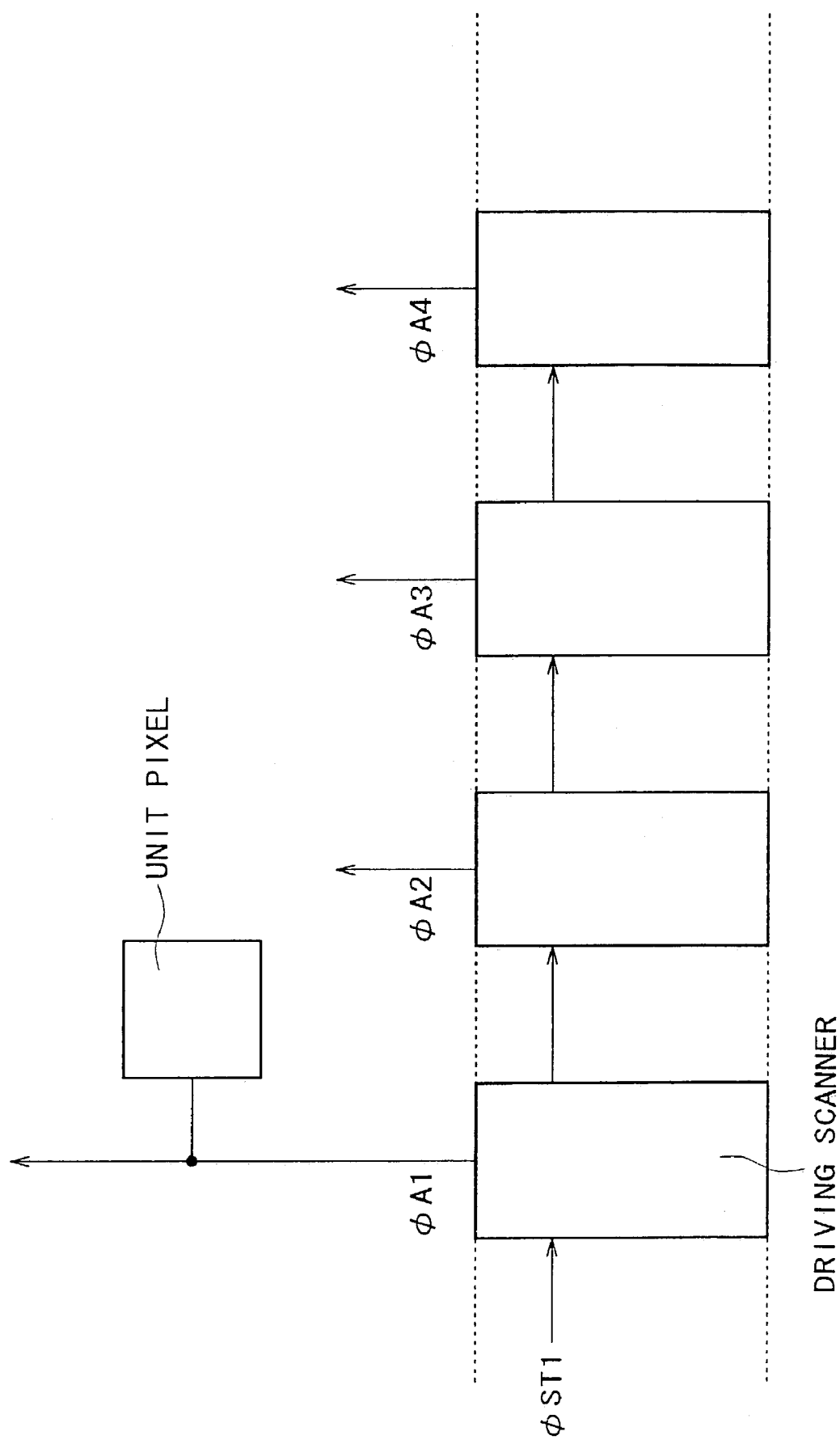

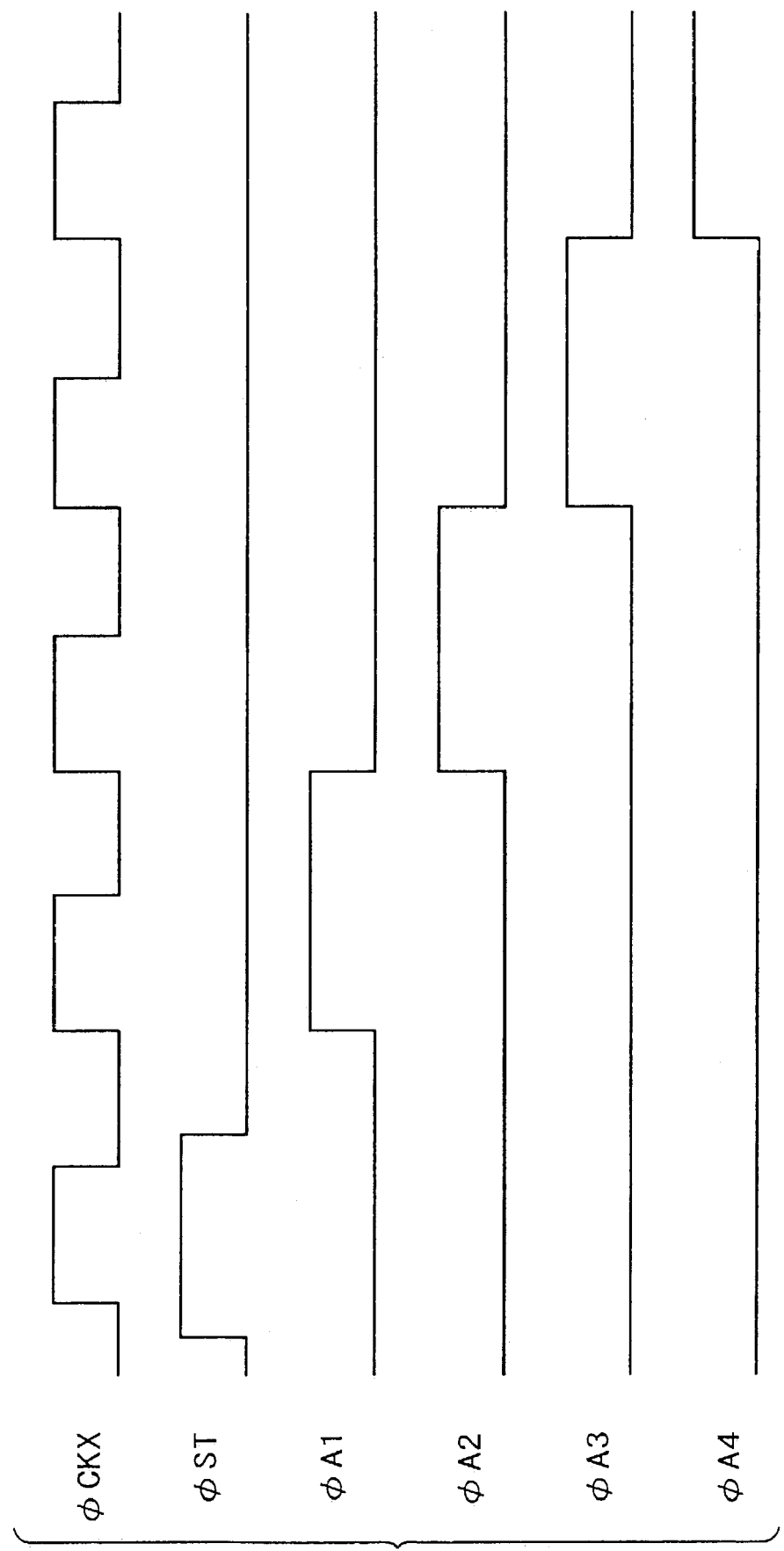

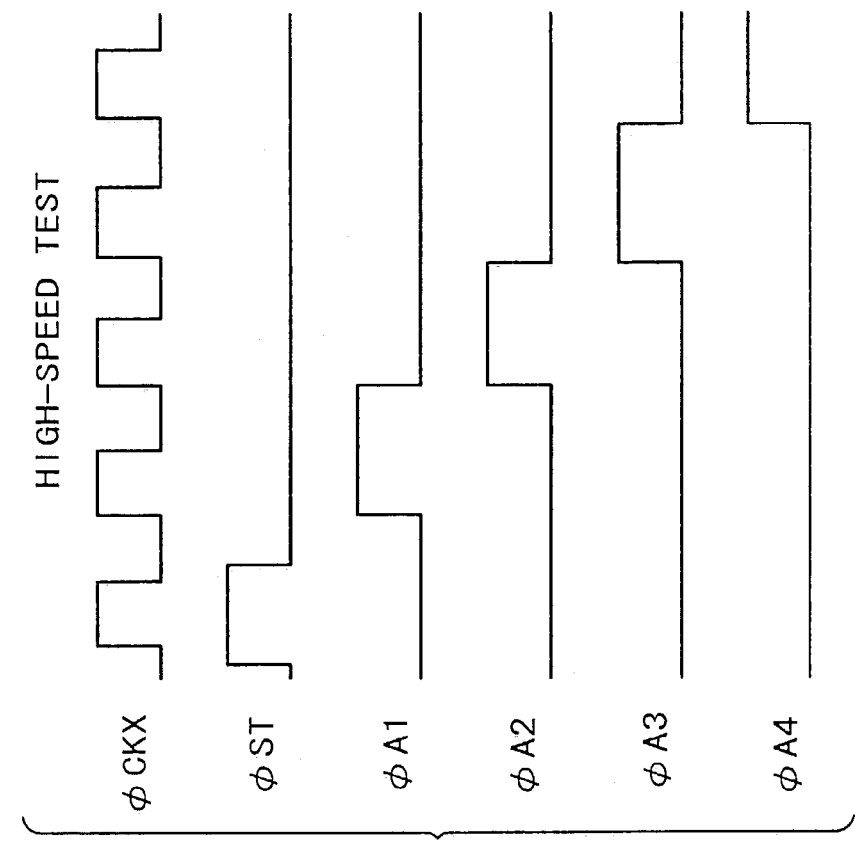
FIG. 9A NORMAL TEST
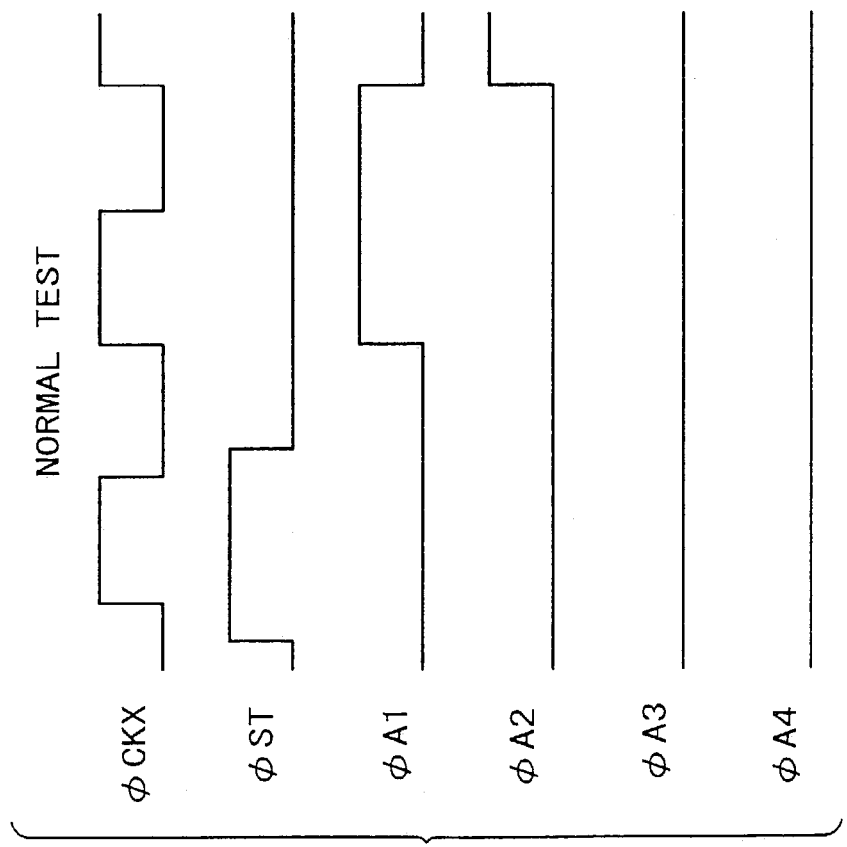
FIG. 9B HIGH-SPEED TEST

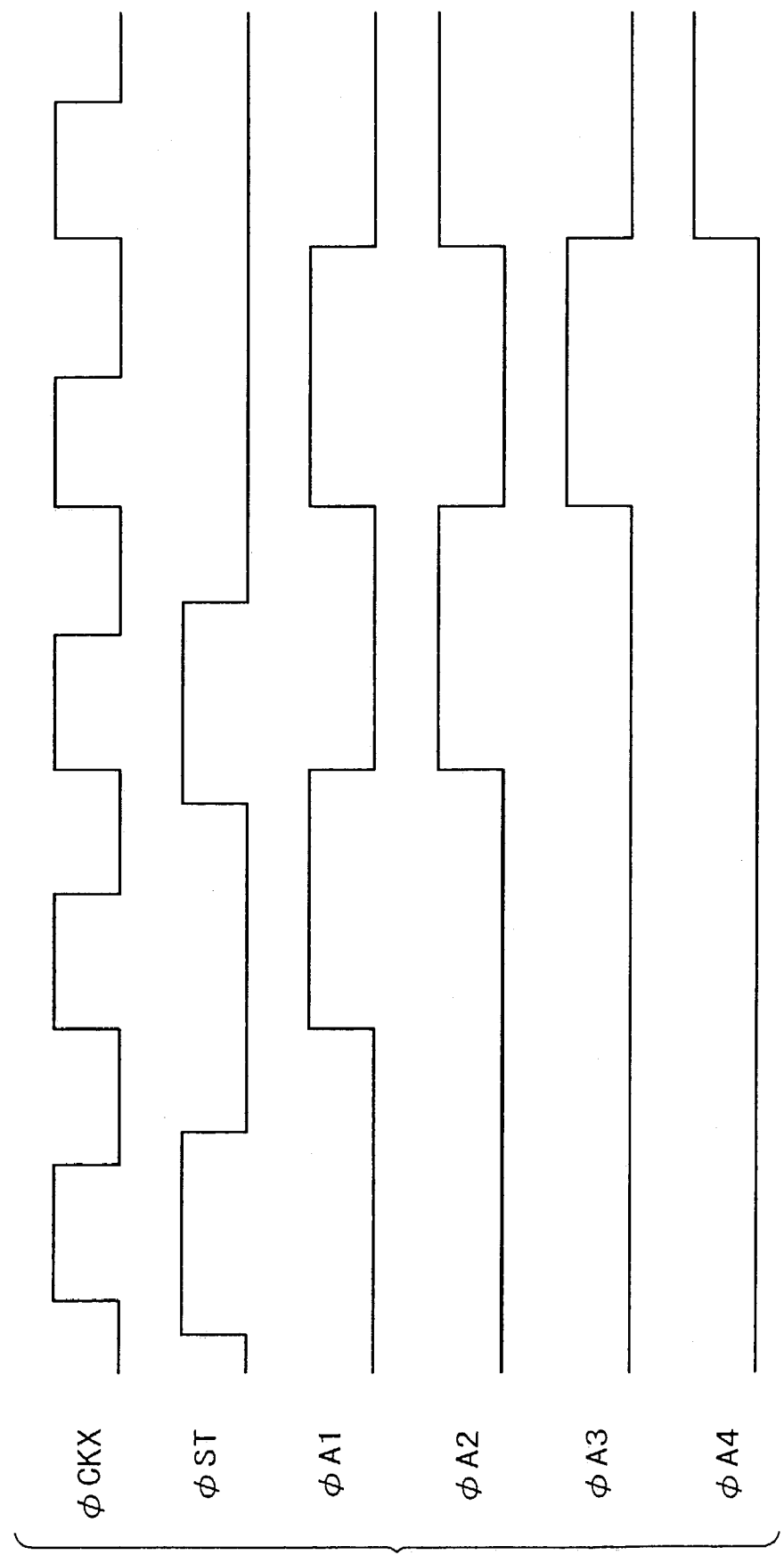

SOLID-STATE IMAGE PICKUP DEVICE AND PIXEL DEFECT TESTING METHOD THEREOF

BACKGROUND OF THE INVENTION

The present invention relates to a solid-state image pickup device such as a CCD image sensor, a CMOS image sensor or the like, and, particularly, to a pixel defect testing method for testing the solid-state image pickup device for a pixel defect.

Solid-state image pickup devices using a CCD image sensor, a CMOS image sensor or the like have recently been drawing attention as an image input device for various portable terminal apparatuses, digital still cameras, digital video cameras and the like.

A pixel defect can be caused in these solid-state image pickup devices by a local crystal defect of a semiconductor for realizing the solid-state image pickup device, or a dust, stress or the like in a manufacturing process for forming the solid-state image pickup device on a semiconductor.

It is known that such a pixel defect occurring on a solid-state image pickup device results in a white dot, a black dot or the like in an image obtained by the solid-state image pickup device, thus degrading picture quality.

Accordingly, a pixel defect test is performed before shipment of the solid-state image pickup device, for example.

This test uses the same method of reading pixel signals of all pixels as in normal use to pick up an image of a completely black subject at the time of detection of a white dot and pick up an image of a completely white subject at the time of detection of a black dot, for example. When white dots are detected in a completely black image, for example, and a solid-state image pickup device has a certain number of white dots or more or exhibits a certain signal level or more, the solid-state image pickup device is regarded as a defective product, and the solid-state image pickup device is therefore not shipped.

In the meantime, recent solid-state image pickup devices are desired to have more pixels and higher functionality.

Hence, when the number of pixels is further increased, it is expected that an enormous amount of test time will be required with the increase in the number of pixels if solid-state image pickup devices are tested by using the same image pickup operation as in normal use as described above.

For example, a test time required for an SVGA (1280× 1024=1.3 million pixels) solid-state image pickup device is about four times that required for a VGA (640×480=0.33 million pixels) solid-state image pickup device.

Further, recent solid-state image pickup devices are desired to have higher functionality, and it is therefore desired that various circuits be mounted on the same semiconductor substrate in addition to a pixel unit. A more complex test process is required for such a solid-state image pickup device.

FIG. 11 shows an example of configuration of a CMOS image sensor.

As shown in FIG. 11, the CMOS image sensor comprises: a pixel unit 110 having a plurality of unit pixels disposed in a two-dimensional arrangement; a driving circuit 111 for driving each pixel of the pixel unit 110; a CDS (correlated double sampling) circuit 112 for removing noise from an output signal (hereinafter referred to as a pixel output signal) from the pixel unit; an amplifier circuit 113 for amplifying the pixel output signal from the CDS circuit 112; an A/D converter circuit 114 for converting the amplified pixel output signal to a digital form; a timing generator 115 for generating an operating pulse for each of the circuits; and the like.

When the CDS circuit 112 is tested, for example, processing is performed such that the pixel unit 110 and the driving circuit 111 are brought into a standby state and a signal is externally inputted to an input part of the CDS circuit 112 to perform the test.

Thus, each of the circuit parts is usually tested in order from a later stage while circuits other than the circuit being tested are in a standby state. This is because of a problem with circuit configuration, in that each part cannot operate independently. In addition, this is also done to increase test analysis accuracy and improve defect coverage, or the probability of defects being found in a test.

For these reasons, it is expected that an enormous amount of test time will be required as the number and complexity of circuits included in a mounted manner are increased with higher functionality.

As described above, with the conventional pixel defect testing method, the test time is expected to be increased further when the solid-state image pickup device has more pixels and higher functionality.

Further, test signals and a test program used for the test become complicated, and therefore it becomes difficult to create and verify test signals and a test program.

Consequently, the burden and cost required for the test are increased.

SUMMARY OF THE INVENTION

Accordingly, it is an object of the present invention to provide a solid-state image pickup device and a pixel defect testing method thereof that make it possible to perform a test for pixel defects in a short time.

In order to achieve the above object, according to the present invention, there is provided a solid-state image pickup device including: a pixel unit including a plurality of unit pixels that perform photoelectric conversion; a driving circuit for driving the pixel unit to control an output of a pixel output signal; an output signal processing circuit for subjecting the pixel output signal outputted from the pixel unit according to the driving of the driving circuit to predetermined signal processing and outputting a resulting pixel output signal; a pixel defect determining circuit for capturing the pixel output signal outputted from the pixel unit according to the driving of the driving circuit and determining a pixel defect by comparing the pixel output signal with a predetermined reference signal; and a timing generator for supplying a predetermined operating pulse to the driving circuit, the output signal processing circuit, and the pixel defect determining circuit.

Further, according to the present invention, there is provided a pixel defect testing method for a solid-state image pickup device, the solid-state image pickup device including: a pixel unit including a plurality of unit pixels that perform photoelectric conversion; a driving circuit for driving the pixel unit to control output of a pixel output signal; an output signal processing circuit for subjecting the pixel output signal outputted from the pixel unit according to the driving of the driving circuit to predetermined signal processing and outputting a resulting pixel output signal; and a timing generator for supplying a predetermined operating pulse to the driving circuit and the output signal processing circuit; wherein the pixel output signal outputted from the pixel unit according to the driving of the driving circuit is captured independently of the output signal processing circuit, a pixel defect is determined by comparing the pixel output signal with a predetermined reference signal, and a defect test on the pixel output signal outputted from the pixel unit is performed on the basis of an operating pulse from the timing generator.

With the solid-state image pickup device and the pixel defect testing method of the solid-state image pickup device according to the present invention, the pixel defect determining circuit for capturing the pixel output signal from the pixel unit independently of the output signal processing circuit and determining a pixel defect is provided, and a defect test is performed by the pixel defect determining circuit. It is therefore possible to read out the pixel output signal under a higher-speed operation than at the time of normal image output, properly determine a pixel defect, and thus perform a test for a pixel defect in a short time.

For example, the driving circuit has a function of performing a normal reading operation for selecting a pixel at a normal speed and a high-speed reading operation for selecting a pixel at a higher speed than that under the normal reading operation. The driving circuit selects a pixel to read out a signal under the high-speed reading operation in a time of testing the pixel unit for a defect. Alternatively, the driving circuit has a function of performing a normal reading operation for selecting pixels by one pixel or a pixel column or a pixel row and a multi-pixel reading operation for selecting more pixels than that under the normal reading operation. The driving circuit selects pixels to read out a signal under the multi-pixel reading operation in a time of testing the pixel unit for a defect. Further, the driving circuit has a function of performing a normal reading operation for selecting pixels by one pixel or a pixel column or a pixel row and a multi-pixel high-speed reading operation for selecting more pixels than that under the normal reading operation at a higher speed than that under the normal reading operation. The driving circuit selects pixels to read out a signal under the multi-pixel high-speed reading operation in a time of testing the pixel unit for a defect.

The pixel output signal read out more rapidly than normal is subjected to rapid determination processing by a simple comparing calculation by the special determining circuit, and thereby a test for pixel defects can be performed in a short time.

As described above, the solid-state image pickup device according to the present invention is provided with the pixel defect determining circuit for capturing the pixel output signal from the pixel unit independently of the output signal processing circuit and determining a pixel defect, and a defect test is performed by the pixel defect determining circuit. It is therefore possible to read out the pixel output signal under a higher-speed operation than in the time of normal image output, properly determine a pixel defect, and thus perform a test for a pixel defect in a short time.

With the semiconductor devices, camera apparatus, communication apparatus, and image processing apparatus using such a solid-state image pickup device, it is similarly possible to read out the pixel output signal under a higher-speed operation than at the time of normal image output, properly determine a pixel defect, and thus perform a test for a pixel defect in a short time.

Similarly, the pixel defect testing method of the solid-state image pickup device according to the present invention captures the pixel output signal from the pixel unit independently of the output signal processing circuit, determines a pixel defect, and performs a defect test. It is therefore possible to read the pixel output signal a under higher-speed operation than at the time of normal image output, properly determine a pixel defect, and thus perform a test for a pixel defect in a short time.

BRIEF DESCRIPTION OF THE DRAWINGS

FIG. 6 is a block diagram showing a somewhat concrete example of a pixel unit and a driving circuit of the CMOS image sensor shown in FIG. 1;

FIG. 7 is a block diagram showing a concrete example of a configuration of a vertical driving circuit shown in FIG. 6;

FIG. 8 is a timing chart of an example of operation of the vertical driving circuit shown in FIG. 7;

FIGS. 9A and 9B are timing charts of another example of operation of the vertical driving circuit shown in FIG. 7;

FIG. 10 is a timing chart of a further example of operation of the vertical driving circuit shown in FIG. 7.

DETAILED DESCRIPTION OF PREFERRED EMBODIMENTS

A preferred embodiment of a solid-state image pickup device and a pixel defect testing method therefor according to the present invention will hereinafter be described.

The present embodiment enables pixel defect testing of the solid-state image pickup device in a short time by combining a driving circuit capable of making various pixel selections for a pixel unit of the solid-state image pickup device and a determining circuit for determining a fault, such as a pixel defect, from a signal of the selected pixel on a semiconductor chip having the solid-state image pickup device.

Figure 1:
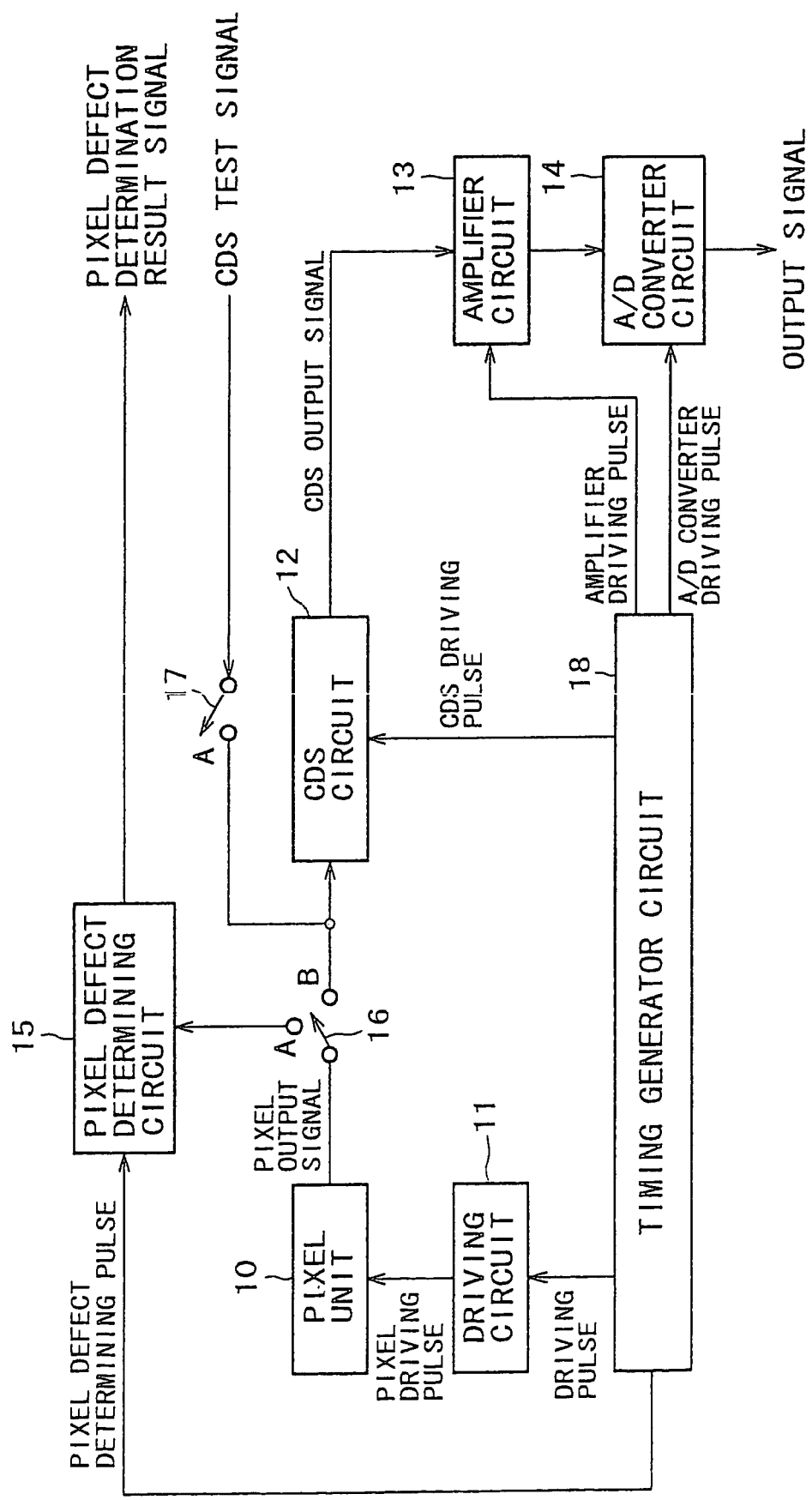
FIG. 1 is a block diagram showing an example of a configuration of a solid-state image pickup device (CMOS image sensor) according to an embodiment of the present invention.

FIG. 1 is a block diagram showing an example of a configuration of the solid-state image pickup device according to the embodiment of the present invention.

The solid-state image pickup device in this example is formed as a CMOS image sensor. The solid-state image pickup device comprises: a pixel unit 10 having a plurality of unit pixels disposed in a two-dimensional arrangement; a driving circuit 11 for driving each pixel of the pixel unit 10; a CDS (correlated double sampling) circuit (output signal processing circuit) 12 for removing noise from a pixel output signal outputted by the pixel unit 10; an amplifier circuit 13 for amplifying the pixel output signal outputted from the CDS circuit 12; an A/D converter circuit 14 for converting the signal amplified by the amplifier circuit 13 to a digital form; a pixel defect determining circuit 15 for determining a pixel defect from the pixel output signal;

switches (selecting circuit) 16 and 17 for selecting an output; a timing generator 18 for generating an operating pulse for each of the circuits; and the like.

Figure 2:
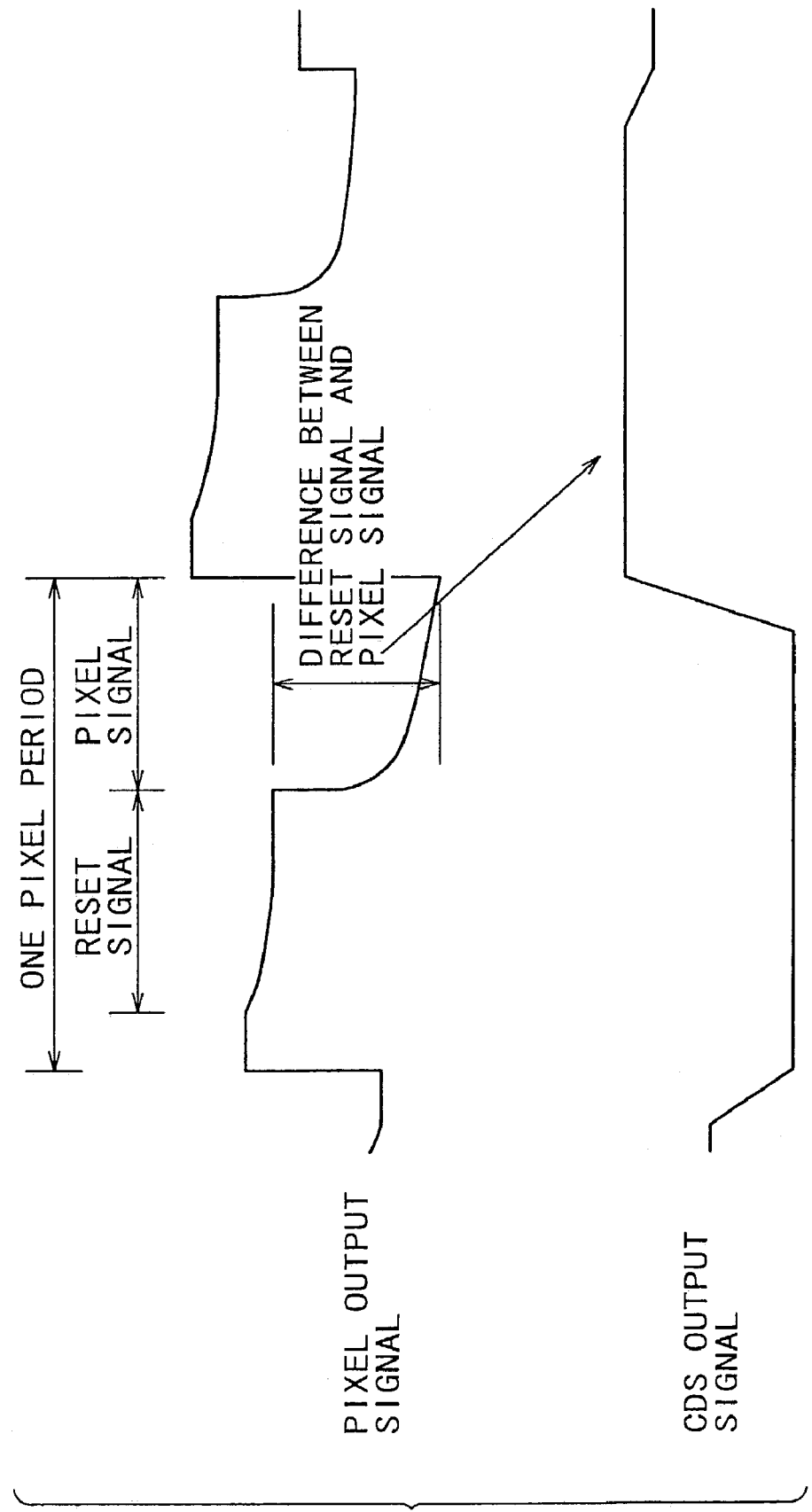
FIG. 2 is a diagram of assistance in explaining an example of a pixel output signal of the CMOS image sensor shown in FIG. 1.

FIG. 2 is a diagram of assistance in explaining an example of the pixel output signal of the CMOS image sensor shown in FIG. 1.

A pixel output signal at the time of normal output includes noise, such as reset noise, amplifier noise and the like. Therefore, a reset signal of only noise (a pixel output signal at the time of reset) is read out first, then a pixel signal including noise (a pixel output signal at the time of image pickup) is read out, and a difference between the reset signal and the pixel signal is outputted, whereby a signal without noise is obtained.

The CDS circuit 12 performs this difference calculation and then outputs a signal obtained by holding a result of the calculation (hereinafter referred to as a CDS output signal).

When an image of a completely white subject is picked up, for example, the difference between the reset signal and the pixel signal is large, thus resulting in a high signal level of the CDS output signal. When an image of a completely black subject is picked up, the difference between the reset signal and the pixel signal is small, and thus the signal level of the CDS output signal should be substantially zero.

Since the level of the reset signal varies for each pixel or each reading, this difference calculation needs to be performed at the time of reading each pixel.

When a completely white image is picked up, the signal level of the CDS output signal of a pixel with a black dot defect, for example, is smaller than that of the CDS output signal of a normal pixel. Similarly, when a completely black image is picked up, the signal level of the CDS output signal of a pixel with a white dot defect is higher than that of the CDS output signal of a normal pixel.

A method of determining a pixel defect from such a pixel output signal from the pixel unit 10 in this example will be described in the following.

The switch 16 and the switch 17 in FIG. 1 are both turned to an A terminal side at the time of a defect test. At the time of normal reading, the switch 16 is turned to a B terminal side, and the switch 17 is used in a non-conducting state.

The driving circuit 11 can carry out various driving methods, such as selecting and driving each pixel of the pixel unit 10 at a high speed, and selecting and driving a plurality of pixels collectively. Such various driving methods are carried out by inputting a driving pulse generated by the timing generator 18 to the driving circuit 11 and inputting a pixel driving pulse from the driving circuit 11 to a pixel.

At the time of a defect test, a pixel output signal is inputted to the pixel defect determining circuit 15 by turning the switches 16 and 17 as described above. When an abnormal pixel output signal resulting from a defective pixel is inputted, the pixel defect determining circuit 15 sets a flag of a pixel defect determination result signal so that a solid-state image pickup device with a pixel defect can be distinguished at the time of the defect test.

Figure 3:
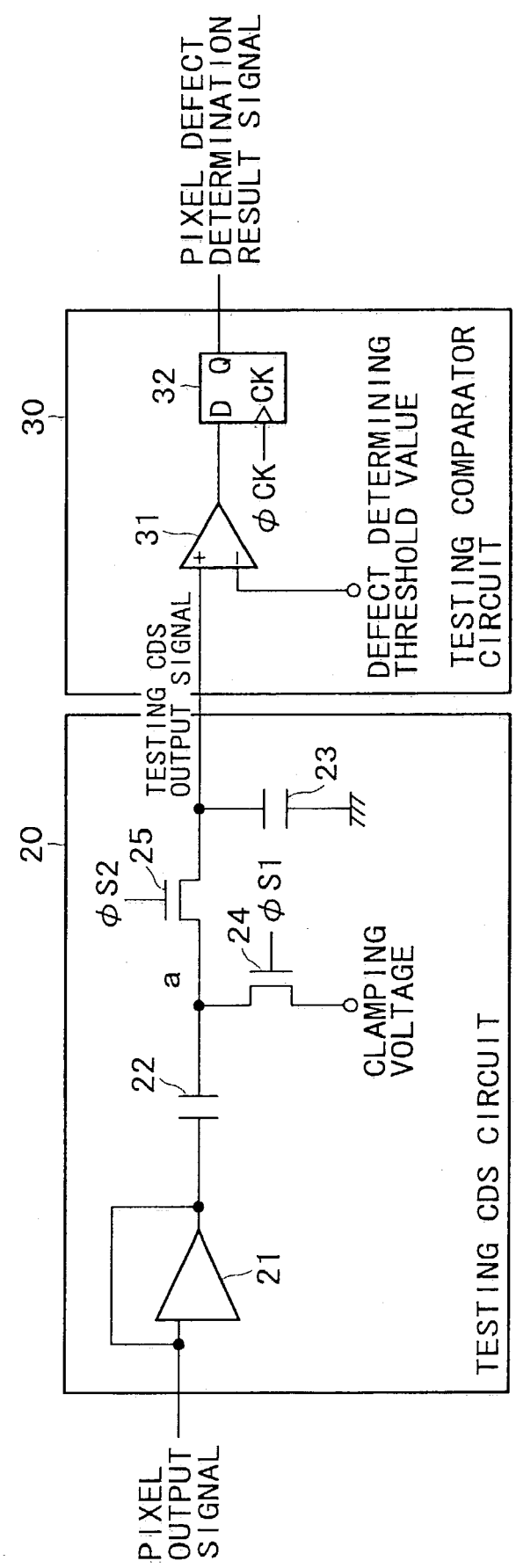
FIG. 3 is a block diagram showing an example of a configuration of a pixel defect determining circuit of the CMOS image sensor shown in FIG. 1.

FIG. 3 is a block diagram showing an example of a configuration of the pixel defect determining circuit 15.

As shown in FIG. 3, the pixel defect determining circuit 15 comprises a testing CDS circuit 20 in a preceding stage and a testing comparator circuit 30 for receiving an output from the testing CDS circuit 20 and comparing the output with a defect determining threshold value.

The testing CDS circuit 20 comprises an input amplifier 21, capacitors 22 and 23, and transistors 24 and 25. As with the CDS circuit 12 in normal image pickup, the testing CDS circuit 20 receives a pixel output signal, obtains a difference between a reset signal and a pixel signal, and then provides a testing CDS output signal without noise.

The testing comparator circuit 30 comprises a comparator 31 and a D-type flip-flop 32. The testing comparator circuit 30 determines whether a pixel is defective or not by comparing the testing CDS output signal from the testing CDS circuit 20 with a predetermined threshold value (defect determining threshold value) by the comparator 31, and then outputs the result as a pixel defect determination result signal.

Incidentally, since the testing CDS circuit 20 is intended for detection of a defective pixel in image pickup with a distinct brightness difference, such as detection of a white dot when a completely black image is picked up or detection of a black dot when a completely white image is picked up, detection accuracy as of the CDS circuit 12 used in normal image pickup is not required of the testing CDS circuit 20.

Figure 4:
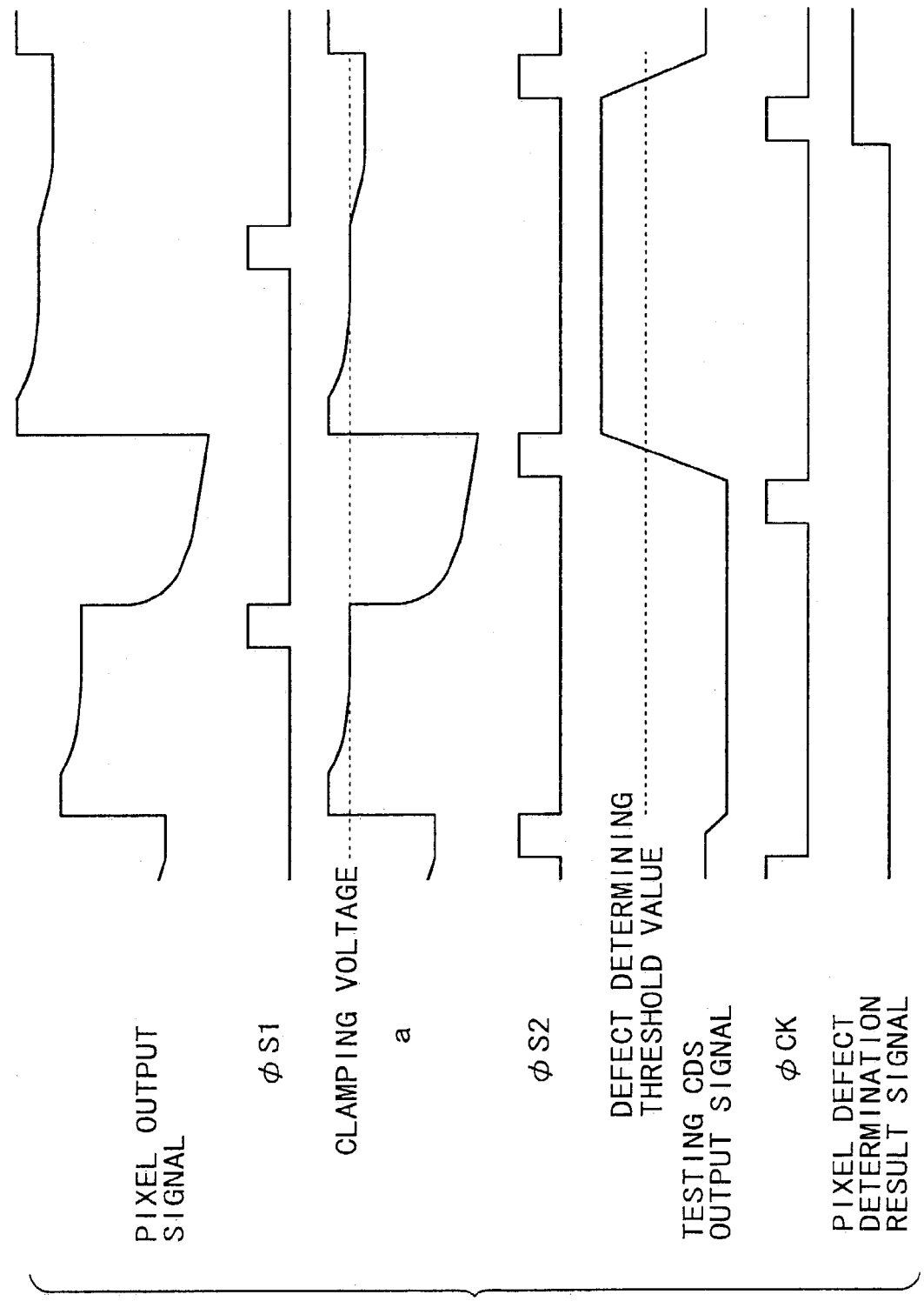
FIG. 4 is a timing chart of an example of operation of the pixel defect determining circuit of the CMOS image sensor shown in FIG. 1.

FIG. 4 is a timing chart of an example of operation of the pixel defect determining circuit 15.

A reset signal part of a pixel output signal is adjusted to a clamping voltage in an "Hi" period of a clamping pulse $\phi$S1 to the clamping transistor 24 (indicated by a in FIG. 4), and a pixel signal part of the pixel output signal is sampled in an "Hi" period of a sampling pulse $\phi$S2 to the sampling transistor 25.

While holding the sampled signal (during a "Lo" period of $\phi$S2), the testing CDS circuit 20 outputs a testing CDS output signal. The D-type flip-flop 32 in an output part of the testing comparator circuit 30 latches a result of comparison between the testing CDS output signal and the defect determining threshold value in timing of a test pulse $\phi$CK, and thus outputs a pixel defect determination signal.

FIG. 4 shows an example of detection of a white dot defect pixel in picking up a completely black image. For a normal pixel output signal, the pixel defect determination signal is "Hi," whereas for a white dot defective pixel, the pixel defect determination signal is "Lo."

At the time of detection of a defective pixel, the timing generator 18 outputs pixel defect determining pulses, such as the pulses $\phi$S1, $\phi$S2, and $\phi$CK. When testing pulses are outputted to the CDS circuit 12, the amplifier circuit 13, and the A/D converter circuit 14 together with the pixel defect determining pulses, the circuits can be tested simultaneously with the test for a defective pixel.

Further, when the timing generator 18 itself has a part for generating the pixel defect determining pulses divided from a timing generating unit and a register for storing various settings for use in normal image pickup operation so that the parts can be tested independently of each other, the test time is further shortened.

Figure 5:
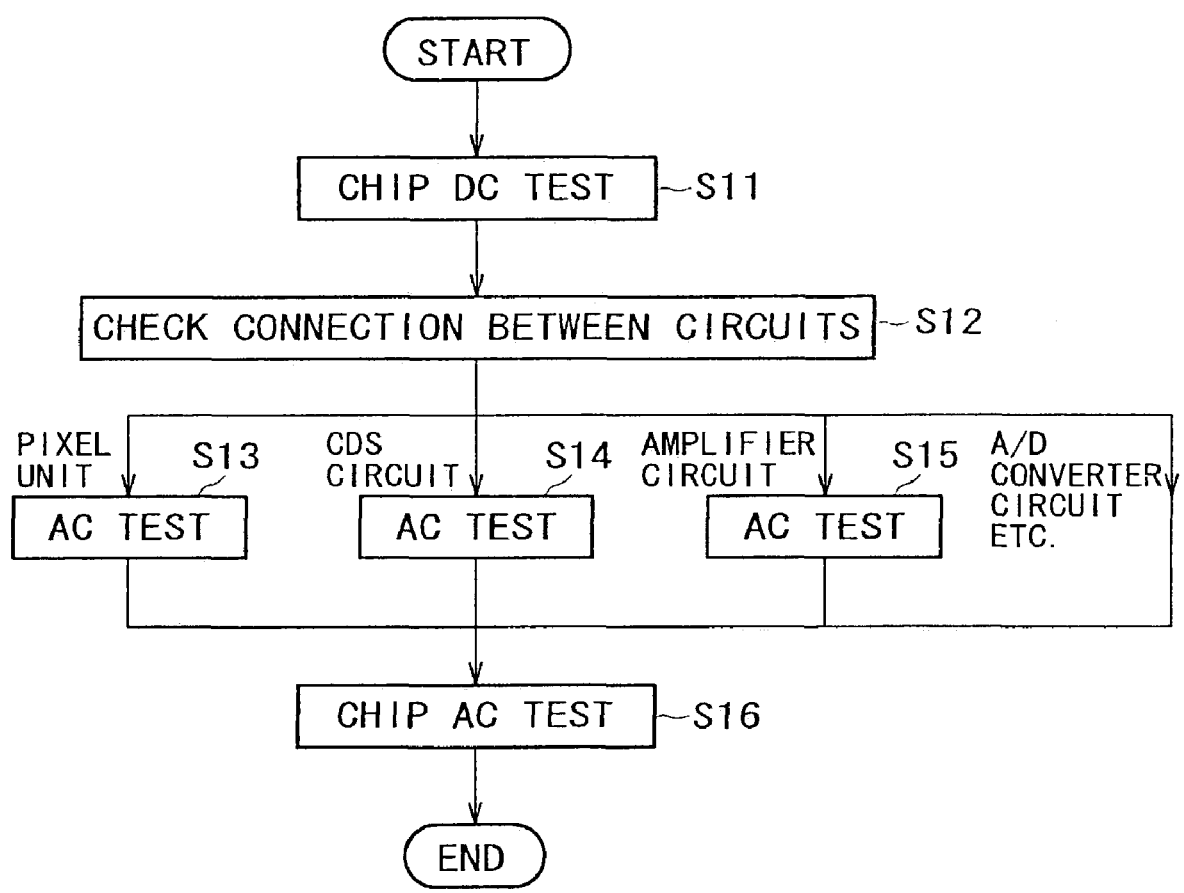
FIG. 5 is a flowchart of an example of operation for testing circuits of the CMOS image sensor shown in FIG. 1 in parallel.
Figure 11:
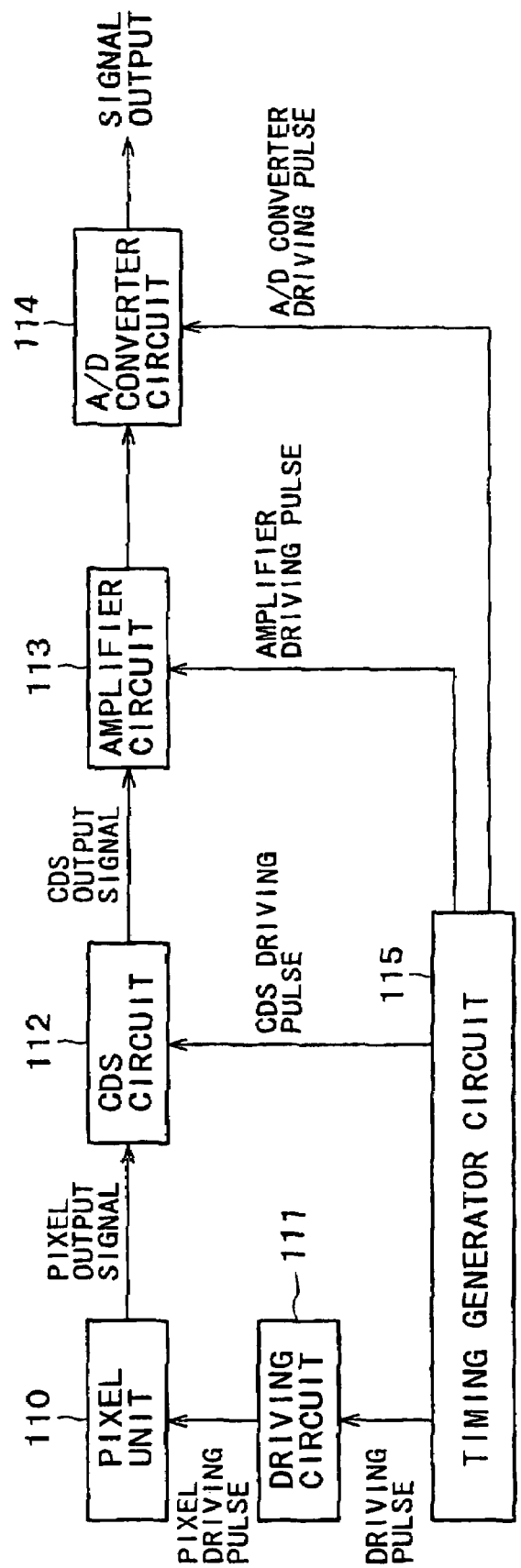
FIG. 11 is a block diagram showing an example of a configuration of a conventional solid-state image pickup device (CMOS image sensor).

FIG. 5 is a flowchart of an example of operation for testing the circuits of the solid-state image pickup device in parallel.

At a start of the test, a chip DC test is performed (step S11). This test performs checks of the static characteristics of the solid-state image pickup device such as, for example, checks for open defects and short defects of the power supply terminals and signal terminals of the chip and checks of the static power supply current.

Thereafter, connections between the circuits are checked by inputting a predetermined signal to the solid-state image pickup device and observing the output (step S12).

AC tests on the circuits are then performed in parallel (steps S13 to S15).

The AC tests perform checks of the dynamic characteristics, such as checks of the functions of the circuits. For example, the AC test on the pixel unit 10 checks for a defective pixel as described above. The AC test on the CDS circuit 12 checks the noise removal of correlated double sampling and the like by supplying a CDS test signal to the input.

It is to be noted that while AC tests other than those on the pixel unit 10, the CDS circuit 12, and the amplifier circuit 13 are omitted in FIG. 5, various parallel combinations can be selected according to the circuits mounted in.

Finally, a chip AC test is performed as a functional check of the solid-state image pickup device as a whole (step S16).

Another embodiment of the present invention will next be described.

FIG. 6 is a block diagram showing an example of a pixel unit 10 comprising two-dimensionally arranged 4×4 unit pixels and a driving circuit 11. Incidentally, 640×480 unit pixels are arranged in VGA.

Because the pixel unit 10 is in the two-dimensional arrangement, the driving circuit 11 comprises two driving circuits, that is, a vertical driving circuit 11A and a horizontal driving circuit 11B. The vertical driving circuit 11A and the horizontal driving circuit 11B are supplied with testing pulses φCKX, φST1, and φST2 from a timing generator 18, and outputs pixel driving pulses of φAn and φBn (n is a positive integer) to the pixel unit.

In selecting a pixel at a position X in FIG. 6, for example, it suffices to output pixel driving pulses from both φA2 and φB3.

FIG. 7 shows a concrete example of a configuration of the vertical driving circuit 11A.

The driving circuit 11A comprises driving scanners corresponding to pixel rows and pixel columns. The driving of the driving scanners is controlled by the operating clock φCKX. Also, φST1 provides timing of a start of pixel driving pulses outputted by the driving circuit 11A.

Incidentally, the horizontal driving circuit 11B has a similar configuration, and therefore a description of the driving circuit 11B will be omitted.

FIG. 8 is a timing chart of an example of operation of the vertical driving circuit 11A shown in FIG. 7. As shown in FIG. 8, after φST1 is inputted, pixel driving pulses φA1, φA2, . . . are outputted in order in synchronism with φCKX.

A pixel output signal varies according to an amount of light incident on the pixel unit 10, and also varies according to a length between a time of selection for output of a pixel and a time of next selection (charge accumulation time). However, a test with a distinct brightness difference, such as the pixel defect test as described above, can properly detect an abnormal pixel even when the charge accumulation time is somewhat shorter.

The charge accumulation time can be readily varied by changing the driving pulse φCK inputted from the timing generator 18 to the driving circuit 11A in FIG. 7. Therefore, the time for the pixel defect test can be shortened by making φCKX at the time of the test shorter than at the time of normal reading, as shown in FIGS. 9A and 9B, for example.

Further, by inputting the driving pulse φST1 in FIG. 7 a plurality of times, a plurality of pixels can be selected simultaneously, and by changing the defect determining threshold value of the pixel defect determining circuit 15 accordingly, the plurality of pixels can be tested for defects simultaneously. It is thus possible to further shorten the time for the pixel defect test. FIG. 10 is a timing chart of an example of this operation.

As described above, the present embodiment can shorten the test time when a solid-state image pickup device is tested for pixel defects.

Specifically, since the pixel unit and other circuits mounted therewith in the solid-state image pickup device can be tested simultaneously, the time for testing the solid-state image pickup device as a whole can be shortened, thereby contributing to a reduction in cost of the solid-state image pickup device.

Also, since the pixel unit can be tested independently, a testing program can be created independently of the other mounted circuits. Therefore, a period of preparation for the test can be shortened because a past testing program is easily applied to facilitate the creation of the testing program.

In addition, since the pixel unit can be tested independently, it is possible to perform a minute test in a short time and improve fault coverage and fault analysis accuracy.

Further, by generating testing pulses by means of the timing generator, it is possible to perform a pixel test on the solid-state image pickup device without preparing an external special tester. Since the special tester for pixel tests does not need to be prepared, the amount of investment can be reduced.

It is to be noted that while the present invention is primarily applied to a CMOS image sensor in the examples described above, the present invention is not limited to this. With a CCD image sensor, it is similarly possible to shorten the test time and improve efficiency by providing a determining circuit for pixel defect testing independently of an output signal processing circuit used at the time of normal output.

Also, the present invention is not limited to a discrete solid-state image pickup device, and may be applied to devices formed as various semiconductor devices by mixing another circuit component having a function of other than an image pickup device on the same chip.

Further, the present invention is applicable to various camera apparatuses (digital video cameras and digital still cameras) formed with an solid-state image pickup device as described above as an image pickup unit, various communication apparatuses having a function of communicating image pickup signals of a solid-state image pickup device by radio or wire, and various image processing apparatuses having the functions of editing and processing picked-up images for output. The present invention covers these semiconductor devices, camera apparatuses, communication apparatuses (including portable apparatuses), and image processing apparatuses.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A solid-state image pickup device comprising:
    a pixel unit including a plurality of unit pixels that perform photoelectric conversion;
    a driving circuit for driving said pixel unit to control output of a pixel output signal, said driving circuit having a function of performing a normal reading operation for selecting pixels at a normal speed and a high-speed reading operation for selecting pixels at a higher speed that that under said normal reading operation;
    an output signal processing circuit for subjecting the pixel output signal outputted from said pixel unit during said normal reading operation performed by said driving circuit to predetermined signal processing, and outputting a resulting pixel output signal;

a pixel defect determining circuit for capturing the pixel output signal outputted from said pixel unit during said high-speed reading operation performed by said driving circuit, and determining a pixel defect by comparing the pixel output signal with a predetermined reference signal, wherein in parallel with a defect test on said pixel unit, a predetermined test signal is inputted to other circuits mounted on a same chip and a defect test on said other circuits is performed; and a timing generator for supplying a predetermined operating pulse to said driving circuit, said output signal processing circuit, and said pixel defect determining circuit.

2. The solid-state image pickup device as claimed in claim 1, further comprising a selecting circuit for selectively operating said output signal processing circuit in a normal output mode and said pixel defect determining circuit in a defect test mode.

3. The solid-state image pickup device as claimed in claim 1, wherein said driving circuit has a function of reading out the unit pixels of said pixel unit by one pixel or a pixel column or a pixel row.

4. The solid-state image pickup device as claimed in claim 1, wherein said driving circuit selects a pixel to read out a signal under said high-speed reading operation in a time of testing said pixel unit for a defect.

5. The solid-state image pickup device as claimed in claim 1, wherein said normal reading operation comprises selecting pixels to read out a signal by one pixel or a pixel column or a pixel row, and said high-speed reading operation comprises selecting more pixels to read out a signal than that under said normal reading operation.

6. The solid-state image pickup device as claimed in claim 5, wherein said driving circuit selects pixels to read out a signal under said high-speed reading operation in a time of testing said pixel unit for a defect.

7. The solid-state image pickup device as claimed in claim 1,
wherein said a normal reading operation comprises selecting pixels to read out a signal by one pixel or a pixel column or a pixel row, and said high-speed reading operation comprises selecting more pixels to read out a signal than that under said normal reading operation at a higher speed than that under said normal reading operation.

8. The solid-state image pickup device as claimed in claim 7,
wherein said driving circuit selects pixels to read out a signal under said high-speed reading operation in a time of testing said pixel unit for a defect.

9. A pixel defect testing method for a solid-state image pickup device, said solid-state image pickup device comprising: a pixel unit including a plurality of unit pixels that perform photoelectric conversion; a driving circuit for driving said pixel unit to control output of a pixel output signal; an output signal processing circuit for subjecting the pixel output signal outputted from said pixel unit according to the driving of said driving circuit to predetermined signal processing, and outputting a resulting pixel output signal; and a timing generator for supplying a predetermined operating pulse to said driving circuit and said output signal processing circuit;

wherein said driving circuit functions to perform a normal reading operation for selecting pixels at a normal speed and a high-speed operation for selecting pixels at a higher speed than under said normal reading operation; and wherein the pixel output signal outputted from said pixel unit during said high-speed operation performed by of said driving circuit is captured independently of said output signal processing circuit, and a pixel defect is determined by comparing the pixel output signal with a predetermined reference signal, and a defect test on the pixel output signal outputted from said pixel unit is performed on the basis of an operating pulse from said timing generator, and wherein in parallel with a defect test on said pixel unit, a predetermined test signal is inputted to other circuits mounted on a same chip and a defect test on said other circuits is performed.

10. The pixel defect testing method of a solid-state image pickup device as claimed in claim 9,
wherein said driving circuit selects a pixel at a higher speed during said high-speed operation than at a time of normal output to read out a signal in a time of testing said pixel unit for a defect.

11. The pixel defect testing method of a solid-state image pickup device as claimed in claim 9,
wherein said driving circuit selects more pixels during said high-speed operation than at a time of normal output to read out a signal in a time of testing said pixel unit for a defect.

12. The pixel defect testing method of a solid-state image pickup device as claimed in claim 9,
wherein said driving circuit selects more pixels at a higher speed during said high-speed operation than at a time of normal output to read out a signal in a time of testing said pixel unit for a defect.

* * * * *